(12) United States Patent
Schueuer et al.

(10) Patent No.: US 10,531,109 B2
(45) Date of Patent: Jan. 7, 2020

(54) PREDICTIVE IMAGE ENCODING AND DECODING WITH PIXEL GROUP BASED QUANTIZATION

(71) Applicants: DOLBY INTERNATIONAL AB, Amsterdam Zuidoost (NL); DOLBY LABORATORIES LICENSING CORPORATION, San Francisco, CA (US)

(72) Inventors: Klaas Heinrich Schueuer, Berlin (DE); Uwe Michael Kowalik, Berlin (DE); Arion Neddens, Berlin (DE); Philipp Kraetzer, Berlin (DE); Guan-Ming Su, Fremont, CA (US)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 62 days.

(21) Appl. No.: 15/546,389

(22) PCT Filed: Jan. 25, 2016

(86) PCT No.: PCT/US2016/014677
§ 371 (c)(1),
(2) Date: Jul. 26, 2017

(87) PCT Pub. No.: WO2016/123001
PCT Pub. Date: Aug. 4, 2016

(65) Prior Publication Data
US 2018/0020226 A1    Jan. 18, 2018

Related U.S. Application Data

(60) Provisional application No. 62/108,142, filed on Jan. 27, 2015.

(51) Int. Cl.
*H04N 19/34*    (2014.01)
*H04N 19/136*    (2014.01)
(Continued)

(52) U.S. Cl.
CPC ........... *H04N 19/34* (2014.11); *H04N 19/119* (2014.11); *H04N 19/124* (2014.11);
(Continued)

(58) Field of Classification Search
None
See application file for complete search history.

(56) References Cited

U.S. PATENT DOCUMENTS 6,731,811 B1 *   5/2004   Rose ................... H04N 19/105
                                                                382/238
7,760,949 B2     7/2010   Segall
(Continued)

FOREIGN PATENT DOCUMENTS

WO    2009/000110    12/2008
WO    2012/027405    3/2012
(Continued)

OTHER PUBLICATIONS

Zhang, Y. et al "High Dynamic Range Video Compression by Intensity Dependent Spatial Quantization in HEVC" IEEE Picture Coding Symposium, Dec. 8-11, 2013, pp. 353-356.
(Continued)

*Primary Examiner* — Mohammad J Rahman

(57) ABSTRACT

The present invention relates generally to images. More particularly, an embodiment of the present invention relates to the pixel group segmented quantization and de-quantization of the residual signal in layered coding of high dynamic range images. By assigning the pixels in the residual image to different pixel groups based on the pixel value of the corresponding pixel in the decoded base layer signal, and by (Continued)

applying pixel group quantizing functions to assigned pixels a more efficient coding can be achieved.

18 Claims, 6 Drawing Sheets

(51) Int. Cl.
| | |
|---|---|
| *H04N 19/17* | (2014.01) |
| *H04N 19/463* | (2014.01) |
| *H04N 19/119* | (2014.01) |
| *H04N 19/124* | (2014.01) |
| *H04N 19/187* | (2014.01) |
| *H04N 19/186* | (2014.01) |
| *H04N 19/172* | (2014.01) |
| *H04N 19/196* | (2014.01) |
| *H04N 19/46* | (2014.01) |
| *H04N 19/98* | (2014.01) |

(52) U.S. Cl.
CPC ......... *H04N 19/136* (2014.11); *H04N 19/17* (2014.11); *H04N 19/187* (2014.11); *H04N 19/463* (2014.11); *H04N 19/172* (2014.11); *H04N 19/186* (2014.11); *H04N 19/197* (2014.11); *H04N 19/46* (2014.11); *H04N 19/98* (2014.11)

(56) References Cited

U.S. PATENT DOCUMENTS

| | | | | |
|---|---|---|---|---|
| 7,769,084 | B1* | 8/2010 | Pun | H04N 19/197 |
| | | | | 375/240.03 |
| 8,014,445 | B2 | 9/2011 | Segall | |
| 8,237,865 | B2 | 8/2012 | Salvucci | |
| 8,537,893 | B2 | 9/2013 | Efremov | |
| 8,761,249 | B2 | 6/2014 | Gao | |
| 9,237,327 | B2* | 1/2016 | Tourapis | H04N 19/597 |
| 10,382,784 | B2* | 8/2019 | Henry | |
| 2006/0083308 | A1* | 4/2006 | Schwarz | H04N 19/56 |
| | | | | 375/240.16 |
| 2007/0110327 | A1* | 5/2007 | Han | H04N 19/115 |
| | | | | 382/251 |
| 2010/0067574 | A1* | 3/2010 | Knicker | G06T 5/002 |
| | | | | 375/240.12 |
| 2011/0090959 | A1 | 4/2011 | Wiegand | |
| 2011/0170792 | A1* | 7/2011 | Tourapis | H04N 19/597 |
| | | | | 382/236 |
| 2012/0201296 | A1* | 8/2012 | Kim | H04N 19/61 |
| | | | | 375/240.03 |
| 2012/0250758 | A1* | 10/2012 | Jou | H04N 19/13 |
| | | | | 375/240.03 |
| 2013/0034154 | A1* | 2/2013 | Song | H04N 19/176 |
| | | | | 375/240.03 |
| 2013/0046803 | A1* | 2/2013 | Parmar | G09G 3/2048 |
| | | | | 708/203 |
| 2013/0107956 | A1 | 5/2013 | Muijs | |
| 2013/0148029 | A1* | 6/2013 | Gish | G09G 5/02 |
| | | | | 348/708 |
| 2013/0182755 | A1 | 7/2013 | Chen | |
| 2013/0202030 | A1* | 8/2013 | Song | H04N 19/105 |
| | | | | 375/240.03 |
| 2013/0223531 | A1 | 8/2013 | Garbas | |
| 2013/0282265 | A1* | 10/2013 | Arita | B60L 58/12 |
| | | | | 701/123 |
| 2013/0329795 | A1* | 12/2013 | Tourapis | H04N 19/597 |
| | | | | 375/240.12 |
| 2014/0050271 | A1* | 2/2014 | Su | H04N 19/136 |
| | | | | 375/240.26 |
| 2014/0185664 | A1 | 7/2014 | Van Der Auwera | |
| 2014/0226719 | A1 | 8/2014 | Yamamoto | |
| 2015/0124867 | A1* | 5/2015 | Jaeger | H04N 19/597 |
| | | | | 375/240.02 |
| 2015/0201200 | A1* | 7/2015 | Cheong | H04N 19/186 |
| | | | | 382/166 |
| 2015/0201201 | A1* | 7/2015 | Cheong | H04N 19/186 |
| | | | | 382/166 |

FOREIGN PATENT DOCUMENTS

| | | |
|---|---|---|
| WO | 2012/142471 | 10/2012 |
| WO | 2012/148883 | 11/2012 |
| WO | 2013/102560 | 7/2013 |
| WO | 2013/127753 | 9/2013 |
| WO | 2014/107255 | 7/2014 |

OTHER PUBLICATIONS

McNeely, J. et al "Voodoo" Error Prediction for Bit-Depth Scalable Video Coding IEEE Visual Communications and Image Processing, Nov. 6-9, 2011, pp. 1-4.

Sansli Done Bugdayci, et al "Improved Weighted Prediction Based Color Gamut Scalability in SHVC" IEEE Visual Communications and Image Processing Conference, Dec. 7, 2014, pp. 201-204.

Chen, M. et al "JPEG Compatible Coding of High Dynamic Range Imagery Using Tone Mapping Operators" Apr. 24-26, 2006, Picture Coding Symposium, pp. 1-6.

* cited by examiner

PREDICTIVE IMAGE ENCODING AND DECODING WITH PIXEL GROUP BASED QUANTIZATION

CROSS-REFERENCE TO RELATED APPLICATIONS

This application claims priority from U.S. Provisional Patent Application Ser. No. 62/108,142, filed on Jan. 27, 2015, which is hereby incorporated by reference in its entirety.

TECHNICAL FIELD OF THE INVENTION

The present invention relates generally to images. More particularly, embodiments of the present invention relate to a method and encoder for encoding a first image using a pixel group based quantization, whereas other embodiments relate to a method and decoder for decoding a first image using a pixel group based de-quantization in layered coding of high dynamic range images.

BACKGROUND OF THE INVENTION

As used herein, the term 'dynamic range' (DR) may relate to a capability of the human psycho-visual system (HVS) to perceive a range of intensity (e.g. luminance, luma) in an image, e.g. from the darkest darks to the brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g. in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g. to those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatuses that use typical cathode ray tube (CRT), liquid crystal display (LCD) with constant fluorescent white back lighting, or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

Such "HDR displays" as they are often called (although actually, their capabilities may more closely approximate the range of VDR) and the DR extension of which they are capable in relation to conventional SDR displays, represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured HDR version may involve applying a tone mapping operator (TMO) to intensity (e.g. luminance, luma) related pixel values in the HDR content. In a second approach, as described in International Patent Application No. PCT/US2011/048861 filed 23 Aug. 2011, herein incorporated by reference for all purposes, generating an SDR image may involve applying an invertible operator (or predictor) on the HDR data. To conserve bandwidth or for other considerations, transmission of the actual captured HDR content may not be a best approach.

Thus, an inverse tone mapping operator (iTMO), inverted in relation to the original TMO, or an inverse operator in relation to the original predictor, may be applied to the SDR content version that was generated, which allows a version of the HDR content to be predicted. The predicted HDR content version may be compared to originally captured HDR content. For example, subtracting the predicted HDR version from the original HDR version may generate a residual image.

The generated SDR content may be encoded by a base layer (BL) encoder. Similarly, the residual image may be encoded by an enhancement layer (EL) encoder. To improve compatibility with legacy encoders, a quantizing function may be applied to the residual image prior to encoding to lower the bit depth of the residual image to be compatible with the enhancement layer (EL) encoder.

The encoded SDR content may be transmitted as a base layer signal and the encoded quantized residual image as an enhancement layer signal. Moreover, metadata may be transmitted that comprises parameters required for the prediction process. The combined data may be transmitted in a single bitstream. This approach typically consumes less bandwidth than would be consumed in sending both the HDR and SDR content directly into the bitstream. Compatible decoders that receive the bitstream sent by the encoder may decode and render the SDR on conventional displays. Compatible decoders however may also use the residual image, the SDR image and the metadata to reconstruct a HDR version of the SDR content for use on more capable displays.

In such layered HDR coding, the residual bitstream may require more than the traditional 8-bits per color pixel for adequate representation. Without any preprocessing, direct coding of a HDR residual using a traditional SDR compressor, such as those described by the MPEG coding standards, may cause severe picture artifacts, such as blockiness and banding.

In an approach, as described in International Patent Application No. PCT/US2012/034747 filed 24 Apr. 2012, herein incorporated by reference for all purposes, the residual image is pre-processed by a non-linear quantizer before being encoded. Such companding (or compansion) of the residual HDR signal allows a subsequent encoder to operate more efficiently and reduces coding artifacts.

Despite the improvements achieved by using a non-linear quantizer, a continuing demand exists to optimally reconstruct the HDR image at the decoder without consuming excessive bandwidth.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

In order to at least partially meet the above-mentioned demand, in an exemplifying embodiment, a method is provided for encoding a first image of which pixel values have a first bit depth, comprising the steps of:

a) obtaining a second image that corresponds to the first image, wherein pixel values of the second image have a second bit depth lower than the first bit depth;

b) encoding the second image using a second encoder;

c) predicting the first image based on the second image or a decoded version of it;

d) calculating a residual image based on a difference between the predicted first image and the first image;

e) grouping pixels in the residual image into a plurality of pixel groups based on characteristics, e.g. pixel values, of corresponding pixels in the second image;

f) applying a respective quantizing function to the pixels in each respective pixel group, wherein each quantizing function is characterized by pixel group specific quantization parameters; and g) encoding the quantized residual image using a first encoder.

The applicant has realized that a drawback of the known approach is that all pixel values of pixels in the residual image are quantized based on the maximum and minimum pixel value among the pixels in the residual image. This causes a significant loss of information in the quantized residual image if only a few pixels in the residual image have a very high or low pixel value, as due to these pixels the whole residual image will be quantized very coarse.

According to a further aspect, this problem may be obviated by grouping pixels in the residual image into a plurality of pixel groups based on characteristics, e.g. pixel values, of corresponding pixels in the second image, and by subsequently applying a respective quantizing function to the pixels in each respective pixel group, wherein each quantizing function is characterized by pixel group specific quantization parameters. This allows pixel groups to be formed in which the pixels have pixel values that are relatively close to each other. Such arrangement of pixel values can more easily be quantized than an arrangement in which a large difference exists between the maximum and minimum pixel value. The quantization can be performed in dependence of pixel group specific quantization parameters such as the maximum and minimum pixel value of pixels in that pixel group.

The method may further comprise decoding the encoded second image, wherein said predicting the first image is based on the decoded encoded second image and/or wherein said grouping pixels in the residual image is based on pixel values of corresponding pixels in the decoded encoded second image. During decoding the encoded first image, a prediction must be made for the reconstructed first image. It is therefore desired that this prediction at the decoder end is identical, or at least very similar, to the prediction at the encoder end. By using the decoded encoded second image, it can be achieved that during both the encoding and decoding processes, the same reference image is used for predicting the first image. This particularly holds if lossy compression techniques are used for encoding the second image. The same holds for the grouping of pixels in the residual image. Grouping is performed based on pixel values of corresponding pixels in the second image. This includes using the second image itself, or images derived therefrom. Advantageously, the decoded encoded second image is used as a reference image because it can be assured, at least to a large extent, that the reference image used for the grouping process is identical at the encoder end and at the decoder end.

Each quantizing function may map pixel values of the pixels in the residual image that correspond to a respective pixel group to a respective pixel value range, wherein the pixel value ranges corresponding to the different pixel groups at least largely overlap. For instance, the pixel value range for a first pixel group may be from $2^1$ up to $2^{10}$, and the pixel value range for a second pixel group may be from $2^0$ up to $2^{10}$. In an embodiment, the respective pixel value ranges are identical.

The bit depth of the pixel values of the pixels in the residual image may be too large for a legacy encoder. Therefore, the bit depth of pixel values of pixels in the quantized residual image may be smaller than the bit depth of pixel values of pixels in the non-quantized residual image. For instance, in an embodiment the bit depth for the residual image and the quantized residual image may be 14 and 8 bits, respectively.

Each quantizing function may map the range of pixel values of the pixels in a given pixel group to substantially the full range offered by the bit depth of pixel values in the quantized residual image. For instance, if the available bit depth of the quantized residual image is 8 bits, the range of pixel values of the pixels in a given pixel group, which extends from a given minimum pixel value to a given maximum pixel value, may be mapped to the range 0-255, wherein 0 corresponds to the mapped minimum pixel value and 255 to the mapped maximum pixel value. This shows that by using a plurality of segments, the pixel value range that has to be mapped can be decreased, thereby reducing the loss of information due to the quantizing process.

The first image may be a high dynamic range (HDR) image or a visual dynamic range (VDR) image and in an embodiment, for example, the first bit depth may be in the range 10-16 bits. The second image may be a standard dynamic range (SDR) image and, in an embodiment, for example, the second bit depth may be in the range 8-10 bits. The quantized residual image may be characterized by a bit depth that corresponds to the SDR image. This allows substantially the same encoders to be used for the first and second encoder.

The grouping of pixels in the residual image may comprise, for each pixel in the residual image, comparing the pixel value of the corresponding pixel in the second image, in the decoded encoded second image, or in the predicted first image, to a plurality of pixel value ranges respectively corresponding to the plurality of pixel groups and assigning said each pixel to a given pixel group among said plurality pixel groups if the pixel value of its corresponding pixel falls in the range attributed to that pixel group. Once again, it is noted that the grouping is based on the second image or on images derived or derivable therefrom.

As an example, if two pixel groups are formed, one corresponding to a pixel value range 0-127, and the other pixel group corresponding to a pixel value range 128-255, a pixel in the residual image, for which the corresponding pixel in the second image, in the decoded encoded second image, or in the predicted first image, has a pixel value of 25, will be assigned to the first pixel group.

The pixel group specific quantization parameters may comprise at least one, but preferably all, of the number of pixel groups, the available bit depth of the pixel values of the pixels in the quantized residual image, and, for each pixel group, the maximum and minimum pixel value among the pixel values of the pixels in the pixel group. Additionally, the bit depth of the second image and/or the bit depth of the first image may be added to the metadata. Alternatively, some of the parameters mentioned above can be set prior to the encoding and decoding processes and may therefore be omitted from the metadata. It is noted that the bit depth of the pixel values of the pixels in the residual image generally corresponds to the bit depth of the first image. If not, the latter can be made part of the pixel group specific quantization parameters as stated before. The collection of pixel group specific quantization parameters should be such that a proper decoding can be ensured. To this end, the method may comprise transmitting the encoded second image, the encoded quantized residual image, and each of the pixel group specific quantization parameters, preferably using a single bitstream.

Said obtaining a second image may comprise generating the second image based on the first image and/or converting the first image into the second image and/or inputting a second image. For instance, a HDR capable camera may record a HDR image, i.e. the first image, of a particular scene. Such image can be processed into a SDR image, i.e. the second image, representative of the same scene, albeit at a lower bit depth. Within the context of the present invention, the SDR and HDR image are referred to as corresponding images as they are referring to the same scene. Alternatively, a different second image can be provided that was not generated based on a recorded first image. Examples may include generating a second image based on a first image that was recorded at a different time instant. In this example, the first image refers to a time instant $t=t0$, whereas the second image is obtained by converting a first image that refers to a time instant $t=t1$. It should be noted that both images should have substantially the same graphical content.

The pixel values of pixels in the first and second images may correspond to one color coordinate among a plurality of color coordinates. Examples include YUV, YCbCr, or RGB. At least steps e)-f) may be performed separately for each color coordinate among the plurality of color coordinates. Alternatively, the method of the invention is only performed for a single color coordinate such as the luminance or luma coordinate. Then, the other color coordinates may be quantized in a manner known in the art.

Within the context of the present invention, an image may refer to a frame or a field of a video signal. For instance, an image may refer to a field of an interlaced video signal or to a frame of a progressive video signal. The first and second encoders may be video encoders, which are known in the art, and which may comprise MPEG-2, H.264, or H.265 encoders.

According to a further aspect, a method is provided for decoding a first image that has been encoded using the method as described above, comprising the steps of:
  a) inputting the encoded quantized residual image;
  b) inputting the encoded second image;
  c) inputting each of the pixel group specific quantization parameters;
  d) decoding the inputted encoded second image using a second decoder that corresponds to the second encoder;
  e) predicting a reconstructed first image based on the decoded inputted encoded second image;
  f) decoding the inputted encoded quantized residual image using a first decoder that corresponds to the first encoder;
  g) de-quantizing the decoded inputted encoded quantized residual image, said de-quantizing comprising grouping pixels in the decoded inputted encoded quantized residual image into a plurality of pixel groups based on characteristics, e.g. pixel values, of corresponding pixels in the decoded inputted encoded second image or the predicted reconstructed first image, and applying a respective de-quantizing function to the pixels in each respective pixel group based on the inputted pixel group specific quantization parameters, wherein the de-quantizing function for a given pixel group is the inverse of the quantizing function that corresponds to that pixel group; and
  h) combining the predicted reconstructed first image and the de-quantized decoded inputted encoded quantized residual image to reconstruct the first image.

According to a further aspect, an encoder is provided for encoding a first image of which pixel values have a first bit depth, comprising:
  a first input unit for inputting the first image;
  a second input unit for inputting or generating a second image that corresponds to the first image, wherein pixel values of the second image have a second bit depth that is lower than the first bit depth;
  a second encoder for encoding the second image;
  a predicting unit for predicting the first image based on the second image;
  a comparator for comparing the inputted first image to the predicted first image, and for outputting a residual image based on a difference between the predicted first image and the inputted first image;
  a quantizing unit for quantizing the residual image, said quantizing unit comprising a grouping unit for grouping pixels in the residual image into a plurality of pixel groups based on characteristics, e.g. pixel values, of corresponding pixels in the second image, and a quantizing function application unit for applying a respective quantizing function to the pixels in each respective pixel group, wherein each quantizing function is characterized by pixel group specific quantization parameters; and a first encoder for encoding the quantized residual image.

The encoder may further comprises a second decoder, corresponding to the second encoder, for decoding the encoded second image, wherein the predicting unit is configured for predicting the first image based on the decoded encoded second image and/or wherein the grouping unit is configured for grouping pixels in the residual image into a plurality of pixel groups based on pixel values of corresponding pixels in the decoded encoded second image. The first and/or second encoder may comprise a MPEG-2, H.264, or H.265 encoder.

The encoder may further comprise a transmitting unit for transmitting the encoded second image, the encoded quantized residual image, and each of the pixel group specific quantization parameters, preferably using a single bitstream.

The encoder is preferably configured for implementing the method as described above.

According to a further aspect a decoder is provided for decoding an image that has been encoded using the encoder as described above, comprising:

an input unit for inputting the encoded quantized residual image, the encoded second image, and each of the pixel group specific quantization parameters;

a second decoder, corresponding to the second encoder, for decoding the inputted encoded second image;

a predicting unit for predicting a reconstructed first image based on the decoded inputted encoded second image;

a first decoder, corresponding to the first encoder, for decoding the inputted encoded quantized residual image;

a de-quantizing unit for de-quantizing the decoded inputted encoded quantized residual image, said de-quantizing unit comprising a grouping unit for grouping pixels in the decoded inputted encoded quantized residual image into a plurality of pixel groups based on characteristics, e.g. pixel values, of corresponding pixels in the decoded inputted encoded second image or the predicted reconstructed first image, and a de-quantizing function application unit for applying a respective de-quantizing function to the pixels in each respective pixel group based on the inputted pixel group specific quantization parameters, wherein the de-quantizing function for a given pixel group is the inverse of the quantizing function that corresponds to that pixel group; and a combining unit for combining the predicted reconstructed first image and the de-quantized decoded inputted encoded quantized residual image to reconstruct the first image.

The predicting unit may be configured for predicting a reconstructed first image based on the decoded inputted encoded second image.

BRIEF DESCRIPTION OF THE DRAWINGS

Embodiments of the present invention are illustrated by way of example, and not in way by limitation, in the figures of the accompanying drawings and in which like reference numerals refer to similar elements and in which.

DESCRIPTION OF EXEMPLARY
EMBODIMENTS OF THE INVENTION

In the following description, for the purposes of explanation, several exemplifying examples and numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Figure 1:
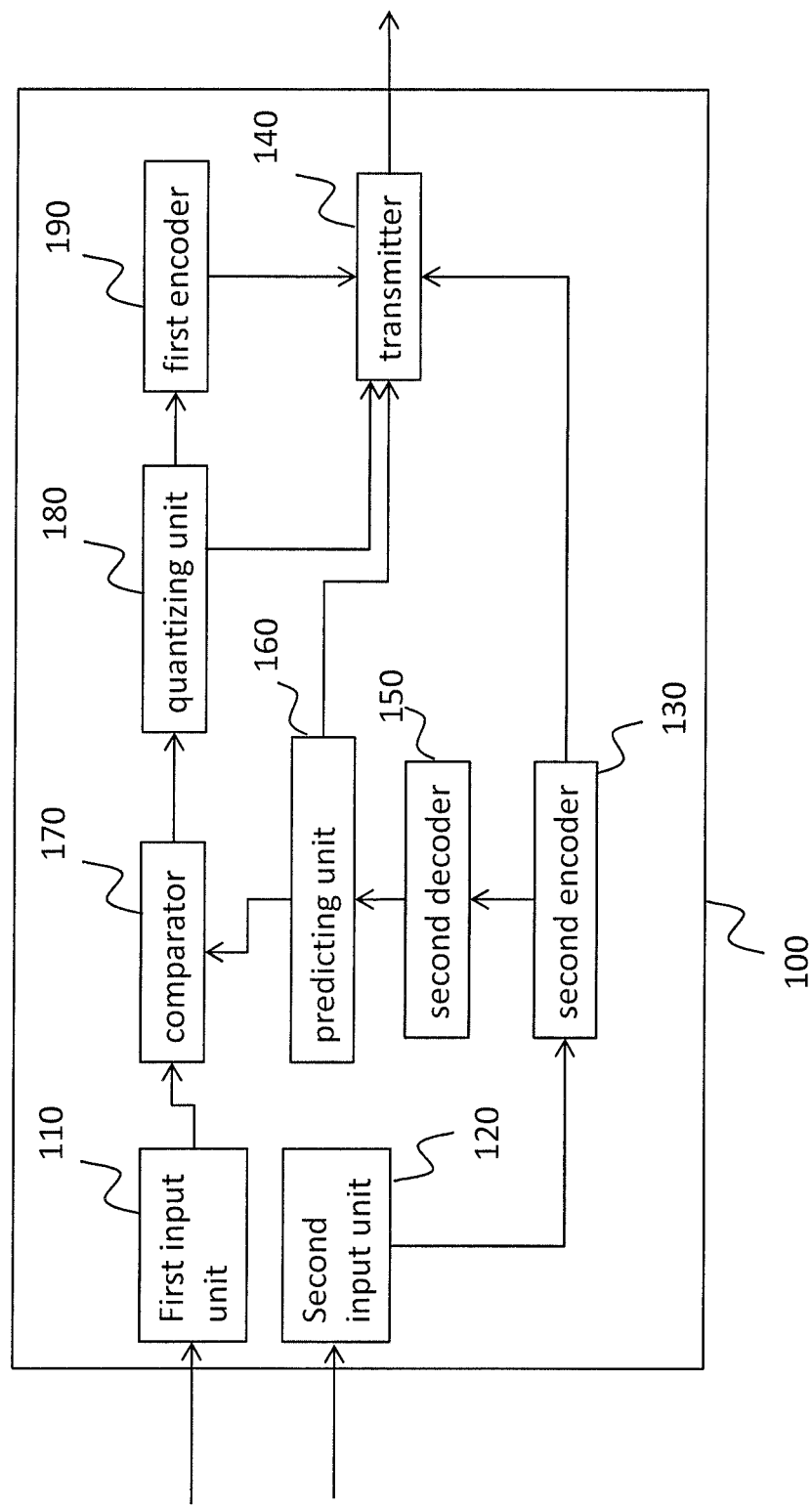
FIG. 1 illustrates an embodiment of an encoder according to the present invention.

FIG. 1 illustrates an embodiment of an encoder 100 according to the present invention. It comprises a first input unit 110 for inputting a first image, and a second input unit 120 for inputting a second image. For example, without limitation, the first image is a HDR image having a bit depth of 14 bits, and the second image is a SDR image having a bit depth of 8 bits. Both images refer to the same scene. In an embodiment, the SDR image may be generated by applying a tone-mapping operation to the HDR image. As an example, the first and second images correspond to a 1080p frame of a progressive video signal.

Encoder 100 comprises a second encoder 130 which encodes the inputted second image. Here, the second encoder comprises a known encoder such as a H.264, H.265, or MPEG-2 encoder, although other encoders are not excluded. Second encoder 130 outputs the encoded second image as a base layer (BL) signal to transmitter 140.

The encoded second image is also sent to a second decoder 150 comprised in encoder 100. Second decoder 150 is complementary to second encoder 130 in the sense that it is capable of decoding the encoded second image.

The decoded encoded second image is fed to a predicting unit 160 which predicts the first image based on the decoded encoded second image. As stated before, predicting unit 160 may be configured as described in PCT/US2012/033605.

The predicted first image is fed to a comparator 170 that compares the predicted first image to the first image inputted via the first input unit 110. Comparator 170 outputs a residual image to quantizing unit 180, which groups pixels in the residual image into a plurality of pixel groups, applies a pixel group specific quantizing function to the grouped pixels, and outputs the quantized residual image to a first encoder 190, which encodes the quantized residual image into a enhancement layer (EL) signal. Here, first encoder 190 may be identical to second encoder 130.

Predicting unit 160 generally outputs metadata which comprises information regarding the predicting process used by predicting unit 160. This data may be different for each processed image. Similarly, quantizing unit 180 outputs metadata comprising the pixel group specific quantization parameters on which the quantizing process was based. The combined metadata, of which at least some elements may vary from image to image, is fed to transmitter 140 along with the BL and EL signals. Transmitter 140 may send this combination of signals and metadata as a single bitstream to a receiver or decoder.

Figure 2:
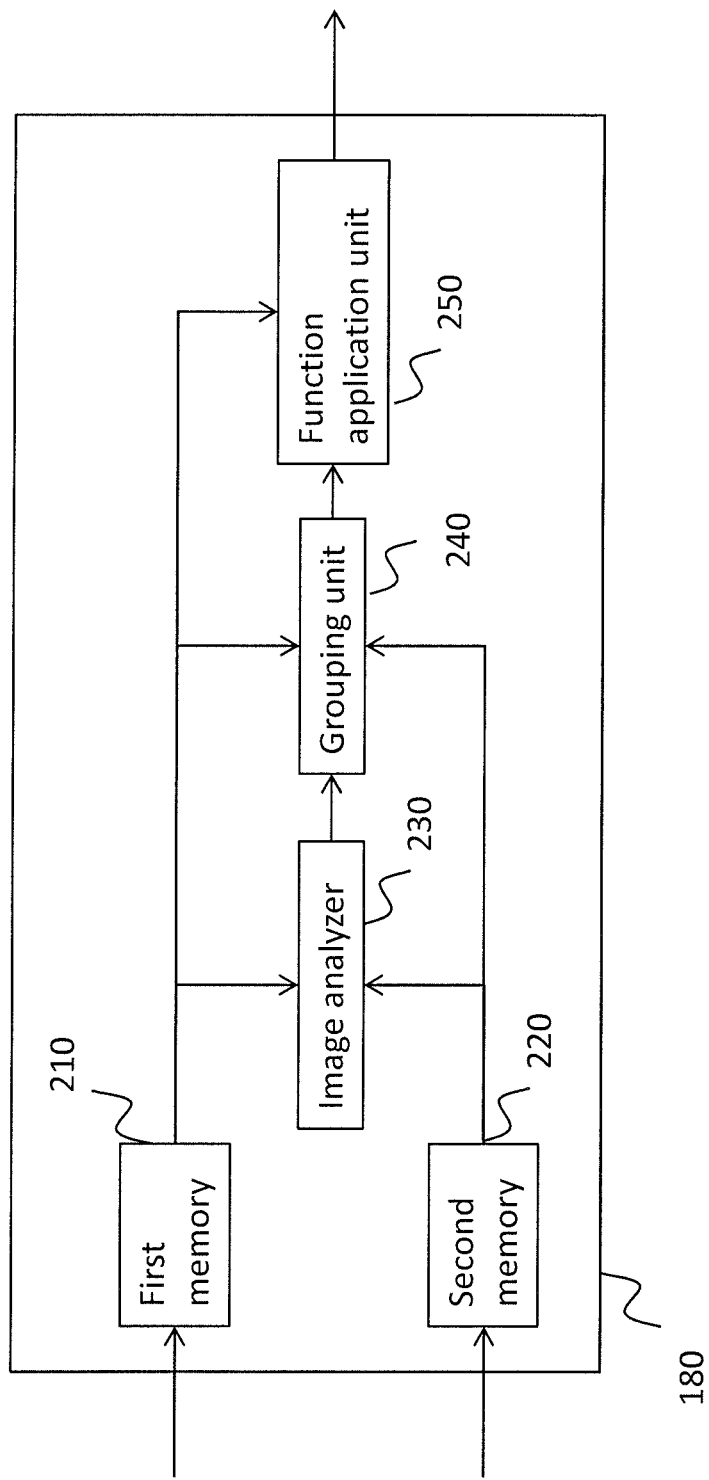
FIG. 2 presents an embodiment of the quantizing unit in the encoder of FIG. 1.

FIG. 2 presents an embodiment of the quantizing unit in FIG. 1. It optionally comprises a first memory 210 for holding the residual image and a second memory 220 for holding the decoded encoded second image.

Quantizing unit 180 further comprises an image analyzer 230 that analyzes the images stored in the first memory 210 and/or second memory 220. It for instance determines the maximum and minimum pixel values of pixels in the residual image. Based on this analysis, a grouping unit 240 groups the pixels in the residual image based on the pixel values of corresponding pixels in the decoded encoded second image. Next, function application unit 250 applies a pixel group specific quantizing function to the pixels in the residual image and outputs the quantized residual image.

Next, an example of encoding a first image is presented that can be executed by encoder 100. Here, comparator 170 outputs a residual image comprising pixels having pixel value $e_j$. Comparator 170 may for instance subtract the predicted first image from the inputted first image or vice versa. Typically, the predicted first image and the inputted first image may have an identical bit depth $B_{first}$, which is generally one bit less than the bit depth $B_{in}$ of the residual image due to the fact that both positive and negative values may occur after subtraction.

Index j indicates the j-th pixel in the residual image. The collection $E_{in}$ of pixel values for the residual image can be denoted by:

$$E_{in} = \{e_j \in R | -2^{B_{in}-1}+1 \leq e_j \leq 2^{B_{in}-1}-1\}$$

For instance, if the bit depth $B_{in}$ equals 8, wherein one bit is used as a sign bit, the pixel values of pixels in the residual image may range from −127 to +127.

Predicting unit 160 predicts the first image based on the decoded encoded second image. This latter image comprises pixels $s_j$, wherein index j indicates the j-th pixel in the decoded encoded second image. The indexation of the decoded encoded second image and the residual image is such that matching indices indicate that pixels correspond. Typically, the collection S of pixel values having bit depth $B_{sec}$ for the decoded encoded second image can be denoted by:

$$S = \{s_j \in \mathbb{N} | 0 \leq s_j \leq 2^{B_{sec}} - 1\}$$

Grouping unit 240 calculates the pixel value ranges for the different pixel groups. As a first step, grouping unit 240 may determine a number $N_{seg}$ indicating the number of pixel groups to be used. Then, as an example, grouping unit may determine an indexing function that operates on a pixel value $s_j$ of pixel j in the decoded encoded second image to return index i of the pixel group to which this pixel should be assigned. Indexing function $f$ can be given by:

$$f(s_j) = i = \text{floor}\left(\frac{s_j \cdot N_{seg}}{2^{B_{sec}}}\right)$$

For instance, if 8 pixel groups are to be used ($N_{seg}$=8) and the bit depth of the decoded encoded second image is 8, the following pixel value ranges can be computed: 0-31, 32-63, 64-95, 96-127, 128-159, 160-191, 192-223, 224-255. The segmentation described above is based on regular intervals. However, the invention is not limited thereto and irregular intervals may equally be used. In such case, the boundaries between the different segments should be defined. Furthermore, these boundaries may be part of the pixel group specific quantization parameters to be sent to the receiver.

When a pixel j of the residual image should be assigned to a certain pixel group i, the indexing function is applied to pixel j of the decoded encoded second image that corresponds to pixel j of the residual image. For instance, when in the example above, pixel j of the decoded encoded second image has a pixel value $s_j$=40, pixel j of the residual image can be assigned to the second pixel group.

Each pixel in the residual image is assigned to a particular pixel group. Then, quantizing function application unit 250 applies to each pixel a pixel group specific quantizing function $Q_i$ to yield the quantized pixel value $e^*_j$ for the j-th pixel. As an example, the following quantizing function may be used:

$$Q_i(e_j) = e^*_j = \text{floor}\left((e_j - e_i^{min}) \cdot \frac{2^{B_{out}} - 1}{e_i^{max} - e_i^{min}} + 0.5\right)$$

wherein $e_i^{max}$ and $e_i^{min}$ are the maximum and minimum pixel values, respectively, among the pixel values of the pixels in the i-th pixel group, $e_j$ is the pixel value of the j-th pixel, which was previously assigned to the i-th pixel group, and wherein $B_{out}$ is the available bit depth for the pixel values in the quantized residual image.

Here, it can be seen that quantizing function $Q_i$ uses pixel group specific quantization parameters, namely $e_i^{max}$ and $e_i^{min}$. It furthermore relies on the available bit depth $B_{out}$ which normally is identical for each pixel group.

As a result, the quantized residual image may have pixels having identical pixel values, but which, due to the fact that the pixels have been assigned to different pixel groups, do not relate to pixels having the same pixel value in the non-quantized residual image.

To allow proper decoding at the decoder, quantizing unit 180 should provide the $e_i^{max}$ and $e_i^{min}$ data for each pixel group as well as $N_{seg}$ and $B_{in}$ as metadata to transmitter 140. In addition, should $B_{first}$ be different than $B_{in}$, the former bit depth could be included in the metadata as well. The above does not exclude embodiments wherein certain parameters, such as the bit depths and the number of segments are fixed prior to the decoding and encoding processes. In such case, the encoder can omit those parameters which are already known by the decoder.

Figure 3:
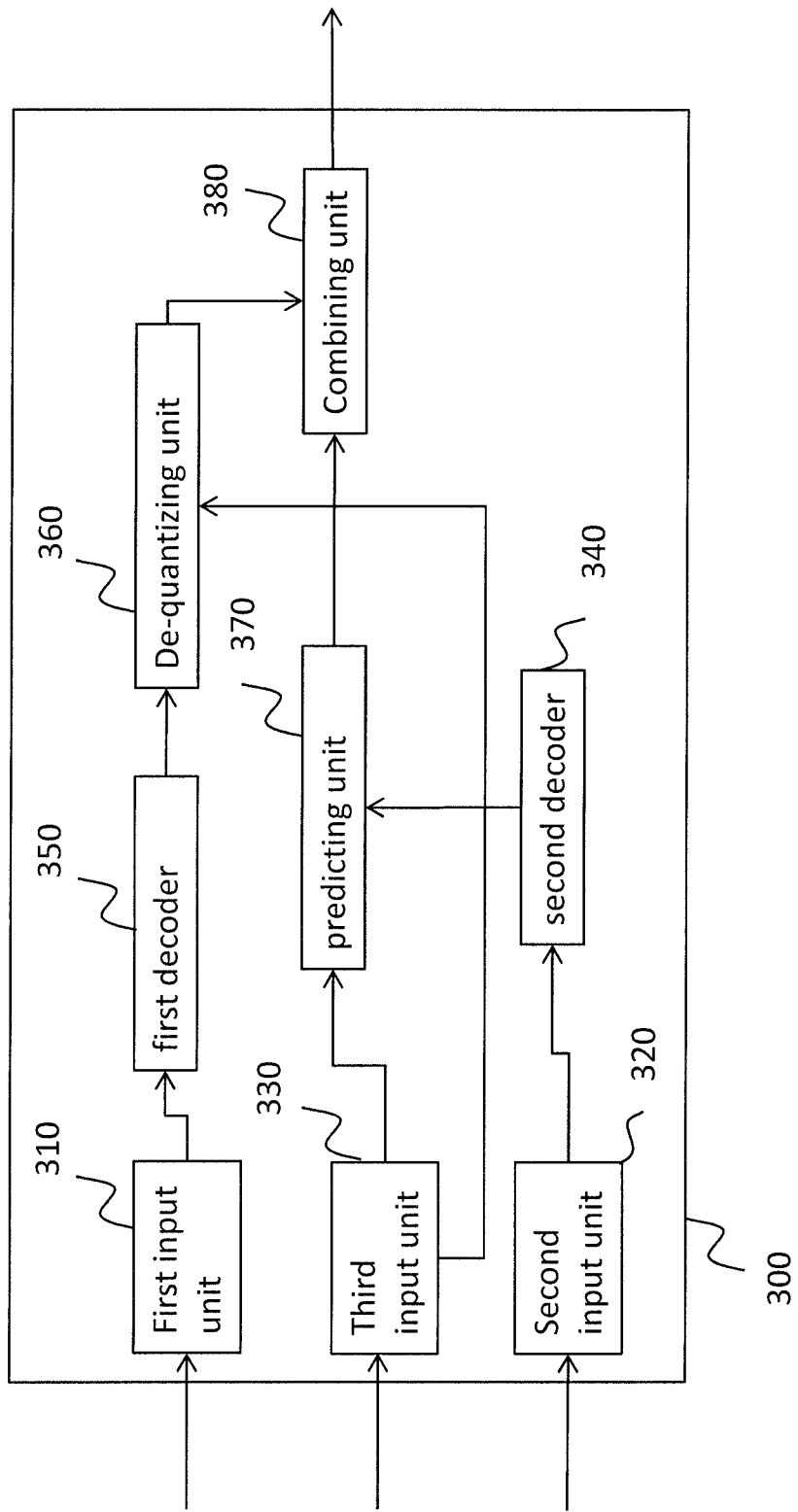
FIG. 3 illustrates an embodiment of a decoder according to the present invention.

Next, the decoding process will be explained by referring to an embodiment of the decoder illustrated in FIG. 3. Decoder 300 comprises a first input unit 310 for inputting and/or receiving an EL signal comprising the encoded quantized residual image, a second input unit 320 for inputting and/or receiving a BL signal comprising the encoded second image, and a third input unit 330 for inputting and/or receiving the metadata sent by encoder 100.

Second decoder 340, which is preferably identical to second decoder 150, decodes the received BL signal. As a result, it outputs the decoded inputted encoded second image in the same manner as the second decoder 150 provided that no information was lost during transmission from encoder 100 to decoder 300.

First decoder 350 decodes the received encoded quantized residual image. The resulting image is fed to a de-quantizing unit 360 which applies the inverse quantizing function to reconstruct the original residual image. In general, the reconstructed residual image or the reconstructed first image are not identical to the original residual image and the original first image, respectively, due to lossy compression techniques that may have been used, due to the quantization process used, and or due to a lossy transport medium in between the encoder and the decoder. The reconstructed residual image is combined by combining unit 380 with a prediction made by predicting unit 370 based on the decoded inputted encoded second image to reconstruct the first image.

Figure 4:
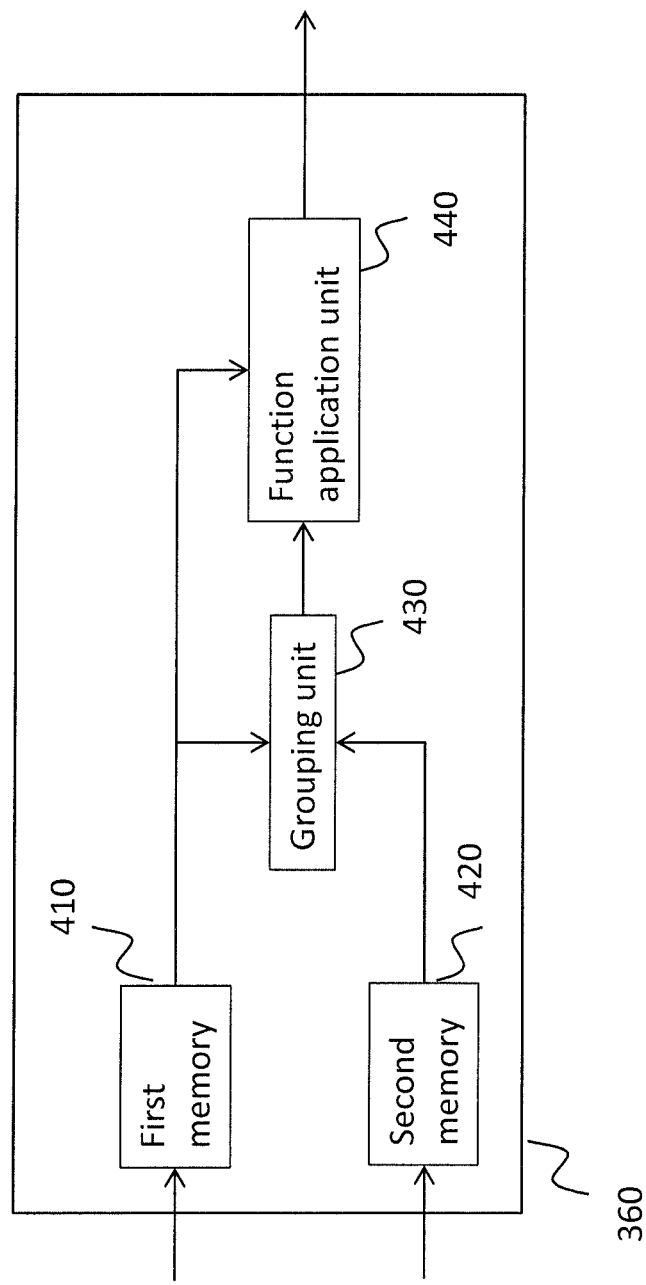
FIG. 4 presents an embodiment of the de-quantizing unit in the decoded of FIG. 3.

De-quantizing unit 360 is illustrated in more detail in FIG. 4. It optionally comprises a first memory 410 for holding the decoded inputted quantized residual image, and a second memory for holding the decoded inputted encoded second image. Grouping unit 430 receives the number of segments $N_{seg}$ and determines bit depth $B_{sec}$ from the decoded encoded second image.

Alternatively, $B_{sec}$ is included by encoder 100 in the metadata, allowing decoder 300 to extract this parameter instead of determining it from the decoded encoded second image. Based on this information, it is able to assign each pixel of the decoded inputted quantized residual image to a pixel group. More in particular, it may use an indexing function f:

$$f(s_j) = i = \text{floor}\left(\frac{s_j \cdot N_{seg}}{2^{B_{sec}}}\right)$$

to determine the index for the j-th pixel in the decoded inputted quantized residual image. Next, de-quantizing function application unit 440 applies a pixel group specific de-quantizing function. To that end, it uses, for each pixel group, the received $e_i^{max}$ and $e_i^{min}$ data comprised in the received metadata. As an example, de-quantizing function Qi* may be used to operate on the pixel value $e_j^{*,r}$ of the j-th pixel of the decoded inputted encoded quantized residual image, which was previously assigned to the i-th pixel group:

$$Q_i^*(e_j^{*,r}) = e_j^r = \text{floor}\left(e_i^{min} + \frac{e_j^{*,r}(e_i^{max} - e_i^{min})}{2^{B_{out}} - 1} + 0.5\right)$$

wherein $e_j^r$ is the reconstructed pixel value of the j-th pixel of the reconstructed residual image, and wherein the bit depth $B_{out}$ can be determined from the decoded quantized residual image. The computed value is expressed using a bit depth $B_{in}$, which can be derived from the received metadata.

Predicting unit 370 can be configured similarly to predicting unit 160 with the exception that it requires the bit depth $B_{first}$ of the reconstructed first image. This information can be extracted from the received metadata. Alternatively, it is assumed that $B_{first}$ is one bit less than $B_{in}$. The prediction of the first image made by predicting unit 370 can be combined, by combining unit 380, with the de-quantized decoded inputted encoded quantized residual image to reconstruct the first image. Here, combining unit will output the first image using bit depth $B_{first}$.

Figure 5:
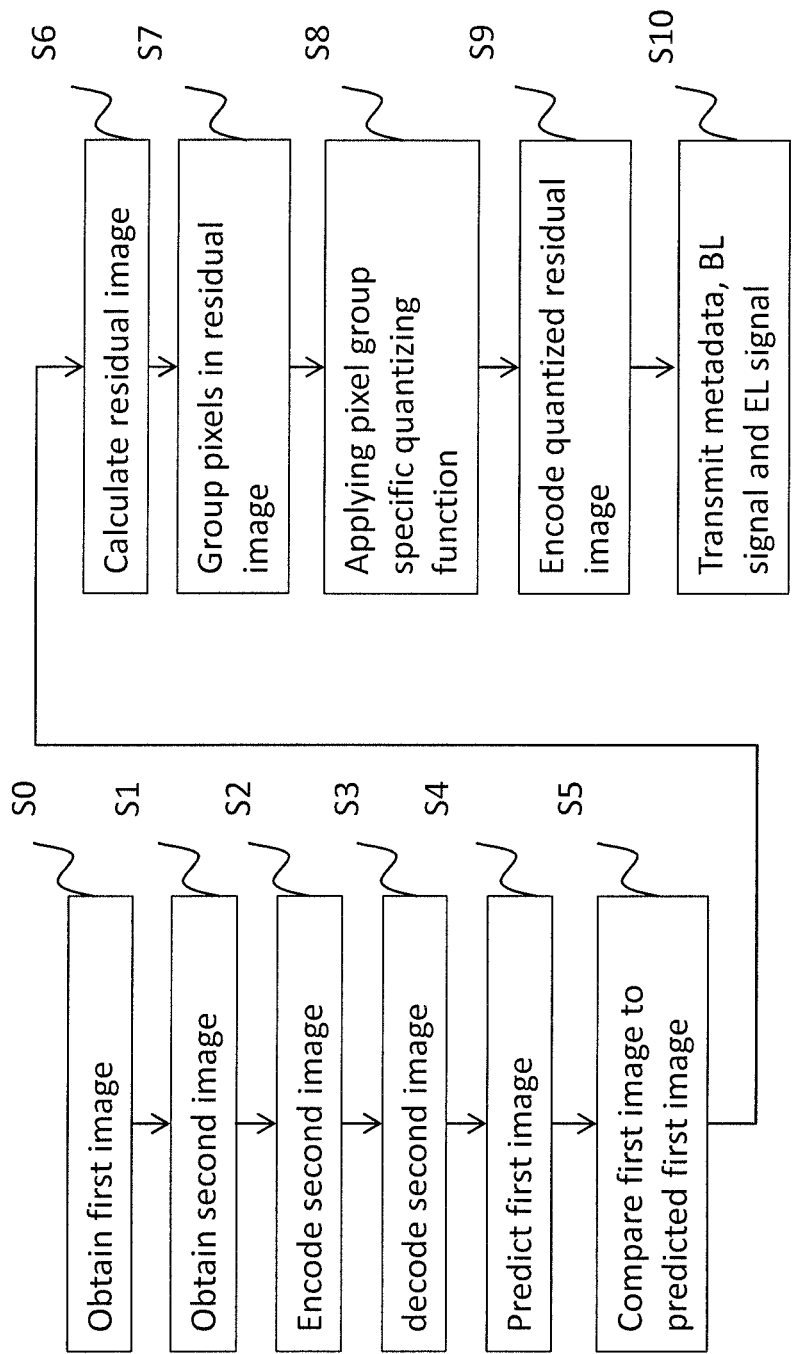
FIG. 5 illustrates a method for encoding a first image in accordance with the present invention.

FIG. 5 illustrates a method for encoding a first image in accordance with the present invention. As a first step S0, the first image is obtained in which pixel values of the pixels in the first image have a first bit depth. Next, in step S1 a second image is obtained that corresponds to the first image, for instance because they refer to the same scene at the same time instant. The pixel values of the second image have a second bit depth that is lower than the first bit depth.

In step S2, the second image is encoded using a second encoder into a base layer (BL) signal. This same signal is decoded in step S3. The first image is predicted in step S4 based on the second image. As an example, the first image is predicted based on the second image, for instance using the decoded encoded second image. The predicted image is compared to the obtained first image in step S5. A residual image is calculated in step S6 based on a difference between the first image and the predicted first image.

Next, in step S7 pixels in the residual image are grouped into a plurality of pixel groups based on pixel values of corresponding pixels in the second image, more preferably based on pixel values of corresponding pixels in the decoded encoded second image.

In step S8, a respective quantizing function is applied to the pixels in each respective pixel group, wherein each quantizing function is characterized by pixel group specific quantization parameters. Subsequently, in step S9, the quantized residual image is encoded by a first encoder into an enhancement layer (EL) signal. Finally, in step S10 metadata comprising the pixel group specific quantization parameters, the BL signal, and the EL signal are transmitted to a decoder and/or receiver.

Figure 6:
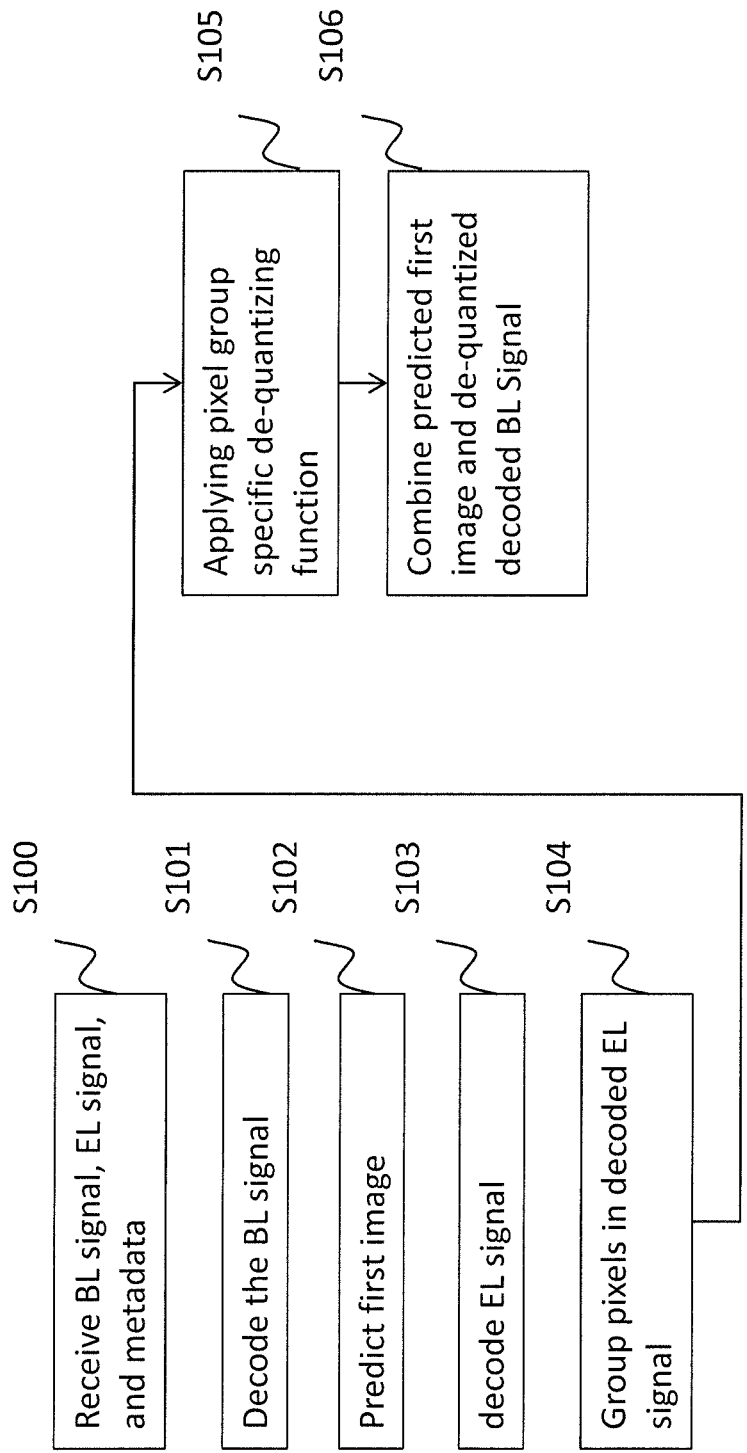
FIG. 6 illustrates a method for decoding a first image in accordance with the present invention.

FIG. 6 illustrates a method for decoding a first image in accordance with the present invention.

As a first step S100, the BL signal, the EL signal, and the metadata are received from an encoder. The metadata comprises each of the pixel group specific quantization parameters used during the encoding process illustrated in FIG. 5, whereas the BL signal comprises the encoded second image and the EL signal comprises the encoded quantized residual image.

Next, in step S101 the inputted encoded second image is decoded using a second decoder that corresponds to the second encoder used during the encoding process. This allows a reconstructed first image to be predicted in step S102 based on the decoded inputted second image.

The inputted encoded quantized residual image is decoded in step S103 using a first decoder that corresponds to the first encoder used during the encoding process. Next, in step S104 pixels in the decoded inputted encoded quantized residual image are grouped into a plurality of pixel groups based on pixel values of corresponding pixels in the decoded inputted encoded second image or based on pixel values of corresponding pixels in the predicted reconstructed first image.

In step S105, a respective de-quantizing function is applied to the pixels in each respective pixel group based on the inputted pixel group specific quantization parameters, wherein the de-quantizing function for a given pixel group is the inverse of the quantizing function that corresponds to that pixel group that was used during the encoding process.

As a final step, the predicted reconstructed first image and the de-quantized decoded inputted encoded quantized residual image are combined in step S106 to reconstruct the first image.

Although the invention has been described using embodiments thereof, it should be apparent to the skilled person that the invention is not limited to these embodiments and that the embodiments may be modified without departing from the scope of the present invention which is defined by the appended claims.

The invention claimed is:

1. A method for encoding a first image of which pixel values have a first bit depth, comprising:
    a) obtaining a second image that corresponds to the first image, wherein pixel values of the second image have a second bit depth lower than the first bit depth;
    b) encoding the second image using a second encoder;
    c) predicting the first image based on the second image;

d) calculating a residual image based on a difference between the predicted first image and the first image; characterized by:

e) grouping pixels in the residual image into a plurality of pixel groups, wherein said grouping comprises: for each pixel in the residual image, comparing the pixel value of the corresponding pixel in the second image, in the decoded encoded second image, or in the predicted first image, to a plurality of pixel value ranges respectively corresponding to the plurality of pixel groups and assigning said each pixel to a given pixel group among said plurality pixel groups if the pixel value of its corresponding pixel falls in the range attributed to that pixel group;

f) quantizing the pixels in each respective pixel group by applying a respective quantizing function to the pixels in each respective pixel group, wherein the bit depth of pixel values of pixels in the quantized residual image is smaller than the bit depth of pixel values of pixels in the non-quantized residual image, wherein each quantizing function maps the range of pixel values of the pixels in a given pixel group to substantially the full range offered by the bit depth of pixel values in the quantized residual image; wherein each quantizing function is characterized by pixel group specific quantization parameters; and g) encoding the quantized residual image using a first encoder.

2. The method according to claim 1, further comprising decoding the encoded second image, wherein said predicting the first image is based on the decoded encoded second image.

3. The method according to claim 1, wherein the first image is a high dynamic range (HDR) image or a visual dynamic range (VDR) image and the first bit depth is in the range 10-16 bits, and wherein the second image is a standard dynamic range (SDR) image and the second bit depth is in the range 4-10 bits.

4. The method according to claim 1, wherein the pixel group specific quantization parameters comprise at least one of:
the number of pixel groups;
the available bit depth of the pixel values of the pixels in the quantized residual image;
for each pixel group, the maximum and minimum pixel value among the pixel values of the pixels in the pixel group.

5. The method according to claim 1, further comprising transmitting the encoded second image, the encoded quantized residual image, and each of the pixel group specific quantization parameters, preferably using a single bitstream.

6. The method according to claim 1, wherein said obtaining a second image comprises generating the second image based on the first image and/or converting the first image into the second image and/or inputting a second image.

7. The method according to claim 1, wherein the first image and the second image are images referring to the same scene.

8. The method according to claim 1, wherein the pixel values of pixels in the first and second images correspond to one color coordinate among a plurality of color coordinates.

9. The method according to claim 8, wherein at least steps e)-f) are performed separately for each color coordinate among the plurality of color coordinates.

10. The method according to claim 1, wherein the image is a frame or a field of a video signal, and wherein the first encoder and second encoder are video encoders.

11. The method according to claim 1, wherein the first and second encoder comprise a MPEG-2, a H.264, or an H.265 encoder.

12. A method for decoding a first image that has been encoded using the method according to claim 1, comprising the steps of:

a) inputting the encoded quantized residual image;
b) inputting the encoded second image;
c) inputting each of the pixel group specific quantization parameters;
d) decoding the inputted encoded second image using a second decoder that corresponds to the second encoder;
e) predicting a reconstructed first image based on the decoded inputted encoded second image;
f) decoding the inputted encoded quantized residual image using a first decoder that corresponds to the first encoder;
g) de-quantizing the decoded inputted encoded quantized residual image, said de-quantizing comprising grouping pixels in the decoded inputted encoded quantized residual image into a plurality of pixel groups based on pixel values of corresponding pixels in the decoded inputted encoded second image or the predicted reconstructed first image, and applying a respective de-quantizing function to the pixels in each respective pixel group based on the inputted pixel group specific quantization parameters, wherein the de-quantizing function for a given pixel group is the inverse of the quantizing function that corresponds to that pixel group; and
h) combining the predicted reconstructed first image and the de-quantized decoded inputted encoded quantized residual image to reconstruct the first image.

13. An encoder for encoding a first image of which pixel values have a first bit depth, comprising:
a first input unit for inputting the first image;
a second input unit for inputting or generating a second image that corresponds to the first image, wherein pixel values of the second image have a second bit depth that is lower than the first bit depth;
a second encoder for encoding the second image;
a predicting unit for predicting the first image based on the second image;
a comparator for comparing the inputted first image to the predicted first image, and for outputting a residual image based on a difference between the predicted first image and the inputted first image;
a quantizing unit for quantizing the residual image, said quantizing unit comprising a grouping unit for grouping pixels in the residual image into a plurality of pixel groups wherein said grouping comprises: for each pixel in the residual image, comparing the pixel value of the corresponding pixel in the second image, in the decoded encoded second image, or in the predicted first image, to a plurality of pixel value ranges respectively corresponding to the plurality of pixel groups and assigning said each pixel to a given pixel group among said plurality pixel groups if the pixel value of its corresponding pixel falls in the range attributed to that pixel group; wherein each quantizing function is characterized by pixel group specific quantization parameters;
a quantizing function application unit for quantizing the pixels in each respective pixel group by applying a respective quantizing function to the pixels in each respective pixel group, wherein the bit depth of pixel values of pixels in the quantized residual image is smaller than the bit depth of pixel values of pixels in the non-quantized residual image, wherein each quantizing function maps the range of pixel values of the pixels in a given pixel group to substantially the full range offered by the bit depth of pixel values in the quantized residual image; and a first encoder for encoding the quantized residual image.

14. The encoder according to claim 13, further comprising a second decoder, corresponding to the second encoder, for decoding the encoded second image, wherein the predicting unit is configured for predicting the first image based on the decoded encoded second image.

15. The encoder according to claim 13, wherein the first and/or second encoder comprise a MPEG-2, a H.264, or a H.265 encoder.

16. The encoder according to claim 13, further comprising a transmitting unit for transmitting the encoded second image, the encoded quantized residual image, and each of the pixel group specific quantization parameters, preferably using a single bitstream.

17. A decoder for decoding an image that has been encoded using the encoder as defined claim 13, comprising:
an input unit for inputting the encoded quantized residual image, the encoded second image, and each of the pixel group specific quantization parameters;
a second decoder, corresponding to the second encoder, for decoding the inputted encoded second image;
a predicting unit for predicting a reconstructed first image based on the decoded inputted encoded second image;
a first decoder, corresponding to the first encoder, for decoding the inputted encoded quantized residual image;
a de-quantizing unit for de-quantizing the decoded inputted encoded quantized residual image, said de-quantizing unit comprising a grouping unit for grouping pixels in the decoded inputted encoded quantized residual image into a plurality of pixel groups based on pixel values of corresponding pixels in the decoded inputted encoded second image or the predicted reconstructed first image, and a de-quantizing function application unit for applying a respective de-quantizing function to the pixels in each respective pixel group based on the inputted pixel group specific quantization parameters, wherein the de-quantizing function for a given pixel group is the inverse of the quantizing function that corresponds to that pixel group; and
a combining unit for combining the predicted reconstructed first image and the de-quantized decoded inputted encoded quantized residual image to reconstruct the first image.

18. The decoder according to claim 17, wherein the predicting unit is configured for predicting a reconstructed first image based on the decoded inputted encoded second image.

* * * * *